United States Patent
Ghosh et al.

(10) Patent No.: US 11,299,681 B2
(45) Date of Patent: Apr. 12, 2022

(54) PROCESS FOR REDUCING THE AMOUNT OF CARBON DISULPHIDE ($CS_2$) IN A HYDROCARBON FEED

(71) Applicant: Reliance Industries Limited, Mumbai (IN)

(72) Inventors: Swapan Kumar Ghosh, Navi Mumbai (IN); Mukunda Madhab Baishya, Jorhat (IN); Suyog Subhash Salgarkar, Tuljapur (IN); Biswajit Shown, West Bengal (IN); Swapnil Prakash Sulakhe, Nashik (IN); Vilas Shirikrishna Bhide, Mumbai (IN); Prafull Patidar, Mandsaur (IN); Mitra Bhanu Patel, Faridabad (IN); Asit Kumar Das, Faridabad (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 525 days.

(21) Appl. No.: 16/325,028

(22) PCT Filed: Aug. 12, 2017

(86) PCT No.: PCT/IB2017/054933
§ 371 (c)(1),
(2) Date: Feb. 12, 2019

(87) PCT Pub. No.: WO2018/029661
PCT Pub. Date: Feb. 15, 2018

(65) Prior Publication Data
US 2021/0284918 A1   Sep. 16, 2021

(30) Foreign Application Priority Data
Aug. 12, 2016   (IN) .............................. 201621027681

(51) Int. Cl.
| C10G 25/00 | (2006.01) |
| C10G 25/05 | (2006.01) |
| B01J 41/07 | (2017.01) |
| B01J 49/57 | (2017.01) |
| B01J 41/14 | (2006.01) |

(52) U.S. Cl.
CPC .............. *C10G 25/05* (2013.01); *B01J 41/07* (2017.01); *B01J 41/14* (2013.01); *B01J 49/57* (2017.01); *C10G 2300/1044* (2013.01); *C10G 2300/207* (2013.01)

(58) Field of Classification Search
CPC ........ C10G 25/02; C10G 25/03; C10G 25/05; C10G 2300/1044; C10G 2300/207; B01J 41/00; B01J 41/04; B01J 41/07; B01J 41/08; B01J 41/09; B01J 41/10; B01J 41/14; B01J 49/00; B01J 49/07; B01J 49/14; B01J 49/57
See application file for complete search history.

(56) References Cited

U.S. PATENT DOCUMENTS

2016/0199829 A1 *   7/2016   Shown ..................... B01J 41/20
521/26

FOREIGN PATENT DOCUMENTS

| JP | H0367740 B2 | 10/1991 |
| JP | 2002020765 A | 1/2002 |

OTHER PUBLICATIONS

International Search Report issued in International Application No. PCT/IB2017/054933 dated Nov. 28, 2017 (4 pages).
Written Opinion issued in International Application No. PCT/IB2017/054933 dated Nov. 28, 2017 (7 pages).

* cited by examiner

*Primary Examiner* — Prem C Singh
*Assistant Examiner* — Brandi M Doyle
(74) *Attorney, Agent, or Firm* — Osha Bergman Watanabe & Burton LLP

(57) ABSTRACT

The present disclosure relates to a process for reducing the amount of carbon disulphide ($CS_2$) in a hydrocarbon feed containing $C_5$-$C_8$ fractions. The hydrocarbon feed is treated with an amine functionalized anion exchange resin (basic anion exchange resin) to obtain a mixture comprising a liquid fraction containing treated hydrocarbon and a solid mass containing an adduct of $CS_2$ and the amine functionalized anion exchange resin. The so obtained liquid fraction containing the treated hydrocarbon is separated from the solid mass to obtain the hydrocarbon having $CS_2$ content less than 2 ppm. The amine functionalized anion exchange resin can be regenerated from the solid mass.

14 Claims, No Drawings

PROCESS FOR REDUCING THE AMOUNT OF CARBON DISULPHIDE ($CS_2$) IN A HYDROCARBON FEED

FIELD

The present disclosure relates to a process for reducing the amount of carbon disulphide ($CS_2$) in a hydrocarbon feed.

Definition

As used in the present disclosure, the following term is generally intended to have the meaning as set forth below, except to the extent that the context in which it is used indicates otherwise.

Amine functionalized anion exchange resin refers to amine functionalized polymer that are capable of exchanging particular ions (amines) within the polymer with ions in a solution that is passed through them.

BACKGROUND

There is a huge demand for high quality hydrocarbon feed, typically $C_5$-$C_8$ fractions, as it serves as a source of useful hydrocarbons. However, hydrocarbon feed also contains other impurities, such as, sulphur compounds and the like. Out of the different sulphur compounds, carbon disulphide ($CS_2$) is an impurity of a particular concern for petrochemical manufacturers. High concentration of $CS_2$ affects many downstream refinery processes, such as cracking of naphtha, hydrogenation processes, and the like. Higher content of $CS_2$ in the hydrocarbon feed is responsible for permanent poisoning of catalysts used in different hydrotreating processes. Thus, removal of $CS_2$ from $C_5$-$C_8$ fractions is necessary to meet the stringent specifications of $CS_2$ concentration in the hydrocarbon feed.

Different methods are known for removing $CS_2$ from the hydrocarbon feed, such as adsorption treatment, hydrodesulphurization, treatment of the hydrocarbon feed with an amine solution. However, the low yields of the desirable product, low efficiency of the process, and the removal of byproducts have been the major concerns associated with these methods.

There is, therefore, felt a need to develop a simple process for reducing the amount of $CS_2$ in the hydrocarbon feed.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a process for reducing the amount of carbon disulphide ($CS_2$) in a hydrocarbon feed.

Another object of the present disclosure is to provide a process for selectively reducing the amount of $CS_2$ from a hydrocarbon feed in the presence of other sulphur compounds.

Other objects and advantages of the present disclosure will be more apparent from the following description, which is not intended to limit the scope of the present disclosure.

SUMMARY

The present disclosure relates to a process for reducing the amount of carbon disulphide ($CS_2$) in a hydrocarbon feed. The process comprising treating the hydrocarbon feed with an amine functionalized anion exchange resin at a temperature in the range of 20° C. to 40° C., at a pressure in the range of 1 bar to 5 bar, for a time period in the range of 1 hour to 10 hours to obtain a mixture comprising a liquid fraction and a solid mass; wherein the liquid fraction comprises a treated hydrocarbon having reduced $CS_2$; and the solid mass comprises an adduct of $CS_2$ and the amine functionalized anion exchange resin. The solid mass is then separated from the liquid fraction to obtain the treated hydrocarbon having $CS_2$ content less than $CS_2$ content present in the hydrocarbon feed (before treatment). The amine functionalized anion exchange resin can be regenerated from the solid mass.

The hydrocarbon feed can be petrochemical naphtha, comprising $C_5$-$C_8$ fractions, wherein the hydrocarbon feed comprises more than 6 ppm of $CS_2$ before treatment and the treated hydrocarbon comprises $CS_2$ content less than 2 ppm after treatment in accordance with the process of the present disclosure. The amine in the amine functionalized anion exchange resin can be at least one selected from primary amine and secondary amine, preferably secondary amine.

DETAILED DESCRIPTION

The $C_5$-$C_8$ fractions of a hydrocarbon feed are a source of useful hydrocarbons. However, the hydrocarbon feed contains a large amount of impurities, such as, sulphur compounds and the like. Carbon disulphide ($CS_2$), as a sulphur impurity is of particular concern for petrochemical manufacturers, as it affects many downstream refinery processes. The $C_5$-$C_8$ fractions of the hydrocarbon feed generally contain $CS_2$ content in the range of 6 ppm to 300 ppm; however the accepted level of $CS_2$ in the hydrocarbon feed is 2 ppm or less. Therefore, there is a need to provide a process for reducing the amount of $CS_2$ in the hydrocarbon feed.

The present disclosure envisages a simple process for reducing the amount of $CS_2$ in the hydrocarbon feed. The process comprises the following steps:

Initially, the hydrocarbon feed is treated with an amine functionalized anion exchange resin at a pre-determined temperature and at a pre-determined pressure for a pre-determined time period to obtain a mixture comprising a liquid fraction and a solid mass. The liquid fraction comprises a treated hydrocarbon and the solid mass comprises an adduct of $CS_2$, and the amine functionalized anion exchange resin.

The hydrocarbon feed of the present disclosure can be petrochemical naphtha containing $C_5$-$C_8$ fractions obtained from crude oil. The petrochemical naphtha containing $C_5$-$C_8$ fractions is a source of useful hydrocarbons.

In one embodiment the hydrocarbon feed comprises more than 6 ppm of $CS_2$ before treatment and the treated hydrocarbon comprises $CS_2$ content less than 2 ppm after treatment in accordance with the process of the present disclosure.

The amine group present in the amine functionalized anion exchange resin can be a primary amine or a secondary amine, preferably a secondary amine. The capacity of the secondary amine to react with $CS_2$ is more as compared to the primary amine, which results in substantial removal of $CS_2$ from the hydrocarbon feed. The amine of the amine functionalized anion exchange resin of the present disclosure can be at least one selected from the group consisting of dimethyl amine, diethyl amine, di-isopropyl amine, di-n- propyl amine, dibutyl amine, dibenzyl amine, ethyl amine, and propyl amine, typically diethyl amine.

Typically, the anion exchange resin is a macro-porous anion exchange polymer, selected from the group consisting of styrene divinylbenzene co-polymer, polyethylene amine, and polyacrylamide.

In accordance with the embodiments of the present disclosure, the pre-determined temperature can be in the range of 20° C. to 40° C. In an exemplary embodiment of the present disclosure, the pre-determined temperature is 25° C.

The pre-determined pressure can be in the range of 1 bar to 5 bar. In an exemplary embodiment of the present disclosure the pre-determined pressure is 1 bar.

The pre-determined time period can be in the range of 1 hour to 10 hours, typically 2 hours to 3 hours.

Further, the solid mass comprising an adduct of $CS_2$ and the amine functionalized anion exchange resin, is separated from the liquid fraction to obtain the hydrocarbon feed having $CS_2$ content less than 2 ppm.

The amine functionalized anion exchange resin can be regenerated from the solid mass by an acid-base treatment.

The reduction of $CS_2$ is facilitated by the reaction of $CS_2$ with the amine present in the amine functionalized anion exchange resin. $CS_2$ present in the hydrocarbon feed reacts with the amine molecule of the amine functionalized anion exchange resin to form dithiocarbamate/alkyl dithiocarbamate. The formation of dithiocarbamate is an exothermic reaction, and therefore can be carried out at lower temperature. The general reaction can be shown as follows:

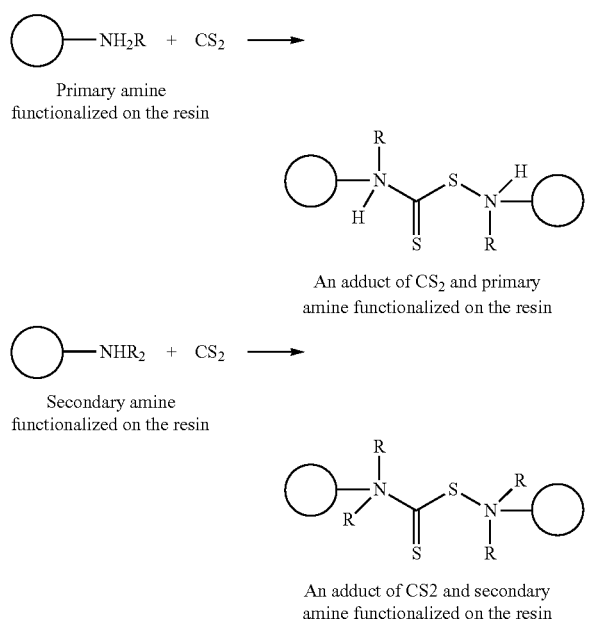

Dithiocarbamate has a strong binding capacity, and therefore binds strongly with the ion exchange resin to form a solid mass. The solid mass so formed, can be easily separated by known methods such as filtration, decantation, centrifugation, and the like. The amine functionalized anion exchange resin used for removal of $CS_2$ content in the process of the present disclosure can be regenerated from the solid mass by acid-base treatment, and can be further used for reducing the amount of $CS_2$ from the hydrocarbon feed.

In accordance with another aspect of the present disclosure, there is provided a process for the regeneration of the amine functionalized anion exchange resin from the solid mass. The process comprises the following steps:

The solid mass is washed with at least one first fluid medium to obtain a first biphasic mixture comprising an organic layer and the solid mass. The organic layer comprising the first fluid medium is separated from the first biphasic mixture to obtain a first residue. The first residue is further treated with at least one second fluid medium to obtain a second biphasic mixture comprising an organic layer and the solid mass. The organic layer comprising the second fluid medium is separated from the second biphasic mixture to obtain a second residue.

The so obtained second residue is then treated with a pre-determined amount of an aqueous acid to obtain a first resultant mixture. The so obtained first resultant mixture is then separated, followed by washing it with water to obtain a third residue and a first effluent. The washing of the first resultant mixture with water is carried out till the effluent is nearly neutral. The acid washing is needed to decompose the adduct (dithiocarbamate) present on the amine functionalized anion exchange resin.

Further, the third residue is treated with a pre-determined amount of an aqueous base to obtain a second resultant mixture. The so obtained second resultant mixture is then separated, followed by washing it with water to obtain a fourth residue and a second effluent. The washing of the second resultant mixture with water is carried out till the effluent is nearly neutral. The washing with a base, is needed to activate the amine functionalized anion exchange resin.

Furthermore, the fourth residue is washed with at least one third fluid medium to remove water and to obtain the regenerated amine functionalized anion exchange resin. The so obtained amine functionalized anion exchange resin can be used again for reducing the amount of $CS_2$ in the hydrocarbon feed.

In accordance with the embodiments of the present disclosure, the first fluid medium can be at least one selected from the group consisting of toluene, hexane, benzene, ethylbenzene, and cyclohexane; and the second fluid medium, and the third fluid medium can be at least one independently selected from the group consisting of methanol, ethanol, propanol, isopropanol, and butanol.

In accordance with the embodiments of the present disclosure, the acid can be at least one selected from the group consisting of $H_2SO_4$ and HCl. The concentration of the acid can be in the range of 1% to 5% in aqueous medium.

In accordance with embodiments of the present disclosure, the base can be at least one selected from the group consisting of NaOH, KOH, and $Ca(OH)_2$. The concentration of the base can be in the range of 1% to 5% in aqueous medium.

The process of the present disclosure, is capable of producing petrochemical naphtha with $CS_2$ content <2 ppm even when the regenerated amine functionalized anion exchange resin is used. The process described in present disclosure has many advantages over conventional methods such as comparatively high yield, mild operating conditions, easy to control conditions, environment friendly, and the like.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Example 1

In a 200 ml glass column/reactor, 75 ml of secondary (Diethyl amine) amine functionalized anion exchange resin bed was prepared. The details of the properties of the functionalized anion exchange resin are summarized in Table 1.

20.7 Lit of synthetic naphtha feed was introduced in the column/reactor at ambient temperature (25-30° C.) and at 1 atm, wherein the flow rate of the feed was maintained at 150 ml/hr and the LHSV was maintained at around 2 Hrs$^{-1}$. The concentration of the $CS_2$ in the feed was varied from 20 ppm to 200 ppm. Samples were drawn at different interval of time and were analyzed for $CS_2$ on SCD based 2D GC. The results are summarized in Table 2.

TABLE 1

Physical Properties of Weak Base resin (secondary amine) Adsorbent

| Property | Description |
| --- | --- |
| Appearance | Off white to brown opaque beads |
| Matrix | Styrene divinyl benzene copolymer |
| Functional group | Diethyl amine (secondary amine) |
| Ionic form as supplied | Free base |
| Total exchange capacity | 1.5 meq/ml, minimum |
| Moisture holding capacity | 47-55 % |
| Particle size range | 0.3 to 1.2 mm |
| >1.2 mm | 5.0%, maximum |
| <0.3 mm | 1.0%, maximum |
| Uniformity co-efficient | 1.7, maximum |
| Effective size | 0.40 to 0.50 mm |
| Operating pH range | 0 to 7 |

TABLE 2

$CS_2$ analysis for secondary amine resin with naphtha feed.

| On-stream Hrs. | Flow rate ml/Hrs. | LHSV Hrs$^{-1}$ | $CS_2$ in Feed, ppm | $CS_2$ in Product, ppm |
| --- | --- | --- | --- | --- |
| 4 | 150 | 2 | 20 * | <1 |
| 16 | 150 | 2 | 200 | <1 |
| 28 | 150 | 2 | 200 | <1 |
| 44 | 150 | 2 | 200 | <1 |
| 52 | 150 | 2 | 200 | <1 |
| 64 | 150 | 2 | 200 | <1 |
| 68 | 150 | 2 | 200 | <1 |
| 80 | 150 | 2 | 200 | <1 |
| 96 | 150 | 2 | 200 | <1 |
| 107 | 150 | 2 | 200 | <1 |
| 118 | 150 | 2 | 200 | <1 |
| 126 | 150 | 2 | 200 | <1 |
| 130 | 150 | 2 | 200 | <1 |
| 135 | 150 | 2 | 200 | 4** |
| 138 | 150 | 2 | 200 | 13*** |

* For the initial hours, the column can be run with low concentration of $CS_2$ i.e. 20 ppm.
and *the $CS_2$ in the product is more than 2 ppm because the resin bed gets saturated after 130 hours It is observed from the above table that, the amine functionalized anion exchange resin successfully reduces the amount of $CS_2$ in the hydrocarbon feed. The initial amount of $CS_2$ present in the hydrocarbon feed was 200 ppm, which is not the acceptable level of $CS_2$ in downstream refinery processes. On contacting the hydrocarbon stream with the amine functionalized anion exchange resin, the amount of $CS_2$ is reduced to less than 2 ppm.

As evident from table 1, the amine functionalized anion exchange resin was found to work efficiently, without deteriorating its activity, for 12 cycles up to 130 hours by maintaining the 200 ppm of $CS_2$ in the feed and maintaining flow rate 150 ml/hrs. However, after 12 cycles and after 135 hours the activity of the amine functionalized anion exchange resin decreased significantly, as the amount of $CS_2$ in the treated hydrocarbon feed increased to 4 ppm and 13 ppm (after 135 hours) at 135 hours and 138 hours, respectively.

It is observed that the on-stream hours for deteriorating the activity of the amine functionalized anion exchange resin depends on the flow rate, LHSV and the content of $CS_2$ in the feed.

Example 2

Once the resin bed outlet showed $CS_2$ level of >5 ppm, the deteriorated amine functionalized anion exchange resin of Example 1 was taken for regeneration. The 75 ml of saturated resin was treated with 75 ml of toluene to obtain a first biphasic mixture comprising toluene and the resin as a solid mass. Toluene was separated from the first biphasic mixture by decantation to obtain a first residue. The first residue was treated with 75 ml of methanol to obtain a second biphasic mixture comprising methanol and the resin as a solid mass. Methanol was separated from the second biphasic mixture by decantation to obtain a second residue.

The second residue was treated with 300 ml of 3% $H_2SO_4$ solution with LHSV of 1 hr$^{-1}$ at 45° C. to obtain a first resultant mixture, which was washed with 1000 ml of DM water at 45° C. till the effluent had a pH of 7, to obtain a third residue and acidic effluent. The third residue was treated with 300 ml of 3% NaOH solution with LHSV of 1 hr$^{-1}$ at 25° C., followed by washing with 1000 ml of DM water to get effluent having pH of 7 to obtain fourth residue and basic effluent.

The fourth residue was treated with 75 ml of methanol to remove left over water, to obtain the regenerated amine functionalized anion exchange resin.

The regenerated resin was used for further experiments. Similarly the regenerated resin was further regenerated 5 times and was used for reducing the amount of $CS_2$ in the hydrocarbon feed. The so results obtained are summarized in the Table 3.

TABLE 3

Adsorption of $CS_2$ per 100 g of secondary amine resin at 5 regeneration cycle

| Secondary amine resin | gm of $CS_2$ adsorbed/100 gm of resin |
| --- | --- |
| Activation of resin | 5.49 |
| First regeneration of resin | 3.75 |
| Second regeneration of resin | 2.38 |
| Third regeneration of resin | 2.59 |
| Fourth regeneration of resin | 2.15 |
| Fifth regeneration of resin | 1.76 |

It is seen from Table-3 that the efficiency of $CS_2$ adsorption by the regenerated resin decreases after each regeneration step. Therefore, the resin can be regenerated 5 times for efficient reduction of $CS_2$ from the hydrocarbon feed.

The examples provided in the draft are for laboratory scale experiments. There will not be any change in the operating parameters for large scale and commercial scale while for equipments (reactor) material of construction might change.

Technical Advancements

The present disclosure described herein above has several technical advantages including, but not limited to, the realization of a process for reducing the amount of $CS_2$ in the hydrocarbon feed, that is eco-friendly;

that selectively reduces the amount of $CS_2$ in the hydrocarbon feed comprising other sulphur compounds; and regenerates the amine functionalized anion exchange resin, which can be further use multiple times for reducing the amounts of $CS_2$ in the hydrocarbon feed.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions, and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for reducing the amount of $CS_2$ in hydrocarbon feed; said process comprising the following steps:
   i. treating said hydrocarbon feed with an amine functionalized anion exchange resin at a pre-determined temperature, and at a pre-determined pressure, for a pre-determined time period, to obtain a mixture comprising a liquid fraction and a solid mass; wherein said liquid fraction comprises a treated hydrocarbon having reduced $CS_2$; and said solid mass comprises an adduct of $CS_2$ and said amine functionalized anion exchange resin;
   ii. separating said solid mass from said liquid fraction to obtain said treated hydrocarbon having $CS_2$ content less than $CS_2$ content of said hydrocarbon feed; and
   iii. optionally, regenerating said amine functionalized anion exchange resin from said solid mass, wherein, said amine is a secondary amine selected from the group consisting of diethyl amine, dimethyl amine, di-isopropyl amine, di-n-propyl amine, dibutyl amine, and dibenzyl amine;
   wherein said anion exchange resin is at least one selected from the group consisting of styrene divinylbenzene, polyethylene amine, and polyacrylamide.

2. The process as claimed in claim 1, wherein said hydrocarbon feed is petrochemical naphtha comprising $C_5$-$C_8$ fractions.

3. The process as claimed in claim 1, wherein the CS2 content of said hydrocarbon feed is more than 6 ppm before treatment and the content of CS2 in said treated hydrocarbon is less than 2 ppm after treatment.

4. The process as claimed in claim 1, wherein said pre-determined temperature is in the range of 20° C. to 40° C.

5. The process as claimed in claim 1, wherein said pre-determined pressure is in the range of 1 bar to 5 bar.

6. The process as claimed in claim 1, wherein said pre-determined time period is in the range of 1 hour to 10 hours.

7. The process as claimed in claim 1, wherein said process is a continuous process.

8. A process for regenerating said amine functionalized anion exchange resin from said solid mass as claimed in claim 1, said process comprising the following steps:
   a. treating said solid mass obtained in step iii) of claim 1 with at least one first fluid medium to obtain a first biphasic mixture comprising an organic layer and a solid mass;
   b. separating said organic layer comprising said first fluid medium from said first biphasic mixture to obtain a first residue;
   c. treating said first residue with at least one second fluid medium to obtain a second biphasic mixture comprising an organic layer and a solid mass;
   d. separating said organic layer comprising said second fluid medium from said second biphasic mixture to obtain a second residue;
   e. treating said second residue with a pre-determined amount of an aqueous acid to obtain a first resultant mixture, followed by washing said first resultant mixture with water to obtain a third residue and a first effluent;
   f. treating said third residue with a pre-determined amount of an aqueous base to obtain a second resultant mixture, followed by washing said second resultant mixture to obtain a fourth residue and a second effluent; and
   g. treating said fourth residue with at least one third fluid medium to obtain said regenerated amine functionalized anion exchange resin.

9. The process as claimed in claim 8, wherein said acid is at least one selected from the group consisting of $H_2SO_4$, $HNO_3$ and HCl.

10. The process as claimed in claim 8, wherein the concentration of said acid is in the range of 1% to 5%.

11. The process as claimed in claim 8, wherein said base is at least one selected from the group consisting of NaOH, KOH, and $Ca(OH)_2$.

12. The process as claimed in claim 8, wherein the concentration of said base is in the range of 1% to 5%.

13. The process as claimed in claim 8, wherein said first fluid medium is at least one selected from the group consisting of toluene, hexane, benzene, ethylbenzene, and cyclohexane.

14. The process as claimed in claim 8, wherein said second fluid medium, and said third fluid medium are at least one independently selected from the group consisting of methanol, ethanol, propanol, isopropanol, and butanol.

* * * * *